United States Patent [19]  [11] 4,318,727
Pietsch  [45]  Mar. 9, 1982

[54] CONTINUOUS CELLULAR GLASS MANUFACTURING METHOD

[76] Inventor: Tibor Pietsch, Santa Domingo de Silos, 8- Madrid 16, Spain

[21] Appl. No.: 159,807

[22] Filed: Jun. 16, 1980

[30] Foreign Application Priority Data

Jun. 18, 1979 [ES] Spain ................................ 481.649

[51] Int. Cl.³ .............................................. C03B 19/08
[52] U.S. Cl. ............................................ 65/22; 65/26
[58] Field of Search ......................... 65/22, 25 R, 26

[56] References Cited

U.S. PATENT DOCUMENTS

| | | | |
|---|---|---|---|
| 2,837,873 | 6/1958 | Lynsavage | 65/22 |
| 3,585,014 | 6/1971 | Malesak | 65/22 |
| 3,607,170 | 9/1971 | Malesak | 65/22 |

FOREIGN PATENT DOCUMENTS

| | | | |
|---|---|---|---|
| 918190 | 2/1963 | United Kingdom | 65/22 |

*Primary Examiner*—Robert L. Lindsay, Jr.
*Attorney, Agent, or Firm*—Buckman and Archer

[57] ABSTRACT

A continuous cellular glass manufacturing method is described. A mixture of ground glass and of one or more substances, such as coal dust, coke dust, graphite dust, one or more powdery and/or liquid and/or diluted hydrocarbons, one or more powdery and/or liquid and/or diluted carbohydrates, one or more hydrocarbons and/or their derivatives, one or more powdery and/or diluted carbonates, fine natural earth, ground natural stones, ground ceramics, cement, one or more powdery and/or dissolved soluble glass substances, water and other similar substances, is partly or totally solidified by drying and/or by reaction, letting it stand for at least 10 minutes. The mixture thus solidified is granulated and the glassy mass so obtained is distributed over a refractory wire conveyor belt or of refractory sheet, after spreading a separating substance in the conveyor belt which prevents the glassy mass from sticking to the conveyor belt. The vitreous mass is then transported by the conveyor belt through a furnace in which the vitreous mass melts, expands and partially or totally cools.

10 Claims, No Drawings

CONTINUOUS CELLULAR GLASS MANUFACTURING METHOD

The object of the present patent of invention application refers to a continuous cellular glass manufacturing method, which provides essential characteristics of novelty, alongside considerable advantages over known processes currently in use.

One of the cellular glass manufacturing processes known consists in that the glass powder mixed with a gas generator, such as coal, for example, is placed in refractory moulds which will subsequently be inserted in a furnace, where the melting of the glass powder takes place, its expansion and cooling, until the cellular glass solidifies (at approximately 600° C.). The moulds are taken out of the furnace, the hot cellular glass blocks are removed from them and placed in a cooling oven, where the cold blocks come out and are then cut to the desired size. The moulds are cleaned, their inside is sprinkled with a product (e. g. lime), the glass powder is separated from the wall of the mould and the cycle is started all over again.

This known process has the serious disadvantage that as the moulds are very heavy (normally their weight is approximately 7 times that of their contents), they consume a great amount of heating energy during heating, which, on the other hand, also makes the heating time much longer, thus calling for a very voluminous and costly installation. Besides, most of the work has to be done by hand, as cleaning the moulds, sprinkling and emptying them, are operations which it is difficult to automatize.

Another known process consists of forming wet plates or blocks by pressing the glass powder with the respective generator agent. These blocks are dried, melted and expanded.

Subsequently they are calibrated with slight pressing and gradually cooled, then cutting them to the desired size.

This process has the advantage that the moulds are avoided, however, it has the disadvantage that drying has to be very slow so that retraction cracks are not produced in the product. Another disadvantage of the process consists in that due to the gap between plates, the whole surface of the furnace cannot be taken full advantage of. Furthermore, it has the additional disadvantage that it is very costly to automatize the process due to the complicated movement which the plates follow, i.e. from the press to the drier where they are fed by a belt; from the drier to the melting and expanding furnace, where they advance on a smooth belt or rotating platform; from here to the calibrating press and finally from this to the cooling tunnel.

Through the present invention, these disadvantages mentioned have been eliminated, obtaining as a result a simple process, provided with the necessary automation, whereby the mixture prepared of glass powder and other agents is placed in a hopper over a conveyor belt, distributing in this way a suitable layer of the said mixture on the aforesaid conveyor belt. This, with the mixture on it, is made to cross a furnace where the melting, expansion, calibrating and cooling takes place. Hence, the product comes out in the form of a continuous cellular glass sheet, which is then cut to the desired size.

But to make this process possible, several important details have been made, which constitute the object of this patent. These conditions are as follows:

A mixture of glass powder and other substances which is suitable for achieving foaming.

Drying and or setting of this mixture.

Granulating.

Arranging a separating substance between the belt and the distributed mass.

That the holes of the belt contains this separating substance and or solid refractory material.

Temperature control over and under the mass or cellular glass.

That the treatment time is as short as possible, to avoid recrystallization occurring.

Calibrating the continuous cellular glass sheet when it is in a soft state.

Cell deformation, which enhance thermal insulation and bending strength, due to the creation of orientation.

But the invention will be understood better by examining the following example, which is given purely for illustrative and not limiting purposes.

SOLE EXAMPLE OF EMBODIMENT 100 kg. of glass powder are loaded into a mixer, with a fineness so that 98% passes through an 0.088 mm. seive, 5 kg. of bentonite and 0.3 kg. of sugar diluted in 5 kg. of water. These ingredients are mixed for 10 minutes. 25 kg. of sodium silicate of 38 Be are then added, and mixed for a further 10 minutes. The mixer is emptied and the said mixture is left to stand for 12 hours, or it is dried until its water content does not exceed 5%.

This hardened mass is granulated passing it through a 2 mm. seive. The granulated mass is loaded into a hopper above a refractory wire conveyor belt, which rotates through a furnace. Before this hopper, another hopper has been arranged which has been filled with a sand and cement mixture, in a proportion of 1:1, which is distributed in a fine layer on the conveyor belt, entering in its holes (the holes of this belt could also have been previously filled with clay). The belt moves at a speed of 45 cm. per minute, distributing on this belt and over the sand and cement mixture, the granulated mixture with a thickness of about 20 mm., which all crosses the furnace. The heating area of the furnace is at a temperature of 830° C. on the continuous plate of granular or expanded mass, and at 810° C. under it. After the expansion area, the calibrating area has been placed, which is at a temperature of 550° C., where three refractory steel rollers calibrate the expanded plate with a thickness of between 6.5 and 7.5 cm. to an even thickness of 6 cm. Following the calibrating area, there is the cooling tunnel, where the product is subjected to gradual cooling. In the area of the furnace where the heating, melting, and expansion occurs, the average temperature at a distance of 5 cm above the mass being heated on the conveyor belt is the same as the temperature 5 cm under the belt or at the most 25° C. higher.

The expansion of the glass layer is allowed to occur mostly in the direction perpendicular to the conveyor belt, the side expansion not exceeding 100% of the initial width.

The period of time the glass is heated in the furnace is 2–100 minutes.

The calibration, compacting and shaping is performed in a direction perpendicular to the conveyor belt or oblique to the conveyor belt. The final assembly may be compacted or flattened to obtain an ellipsoidal shape.

The thermal treatment process from cold to cold lasts roughly 2 hours, so that when it ends, the product can be cut to the desired dimensions, by means of a circular carborundum saw.

After the hopper which contains the granulated mixture, another hopper can be placed containing granular mass to be transformed into dense cellular glass and another hopper containing a granular vitreous enamel. In this way, the final product obtained consists of three superposed layers: the lower one, of insulating cellular glass, with a density of 160 kg/m$^3$ and 6 cm. thick; a medium layer of hard cellular glass with a density of 900 kg/m$^3$ and with a thickness of 0.9 cm., and a final decorative solid glass layer, which can be coloured, with a thickness of 0.1 cm.

After sufficiently disclosing the object of the present patent of invention, it is stated that within its basic essence, innumerable variations in detail are possible, likewise protected, provided they do not alter the essential nature of the investment.

After the description of the present invention, which is declared new and my own invention, the following claims are included.

I claim:

1. A continuous method for the preparation of a cellular glass sheet comprising a lower cellular layer of low density, a second cellular layer of higher density, and an upper decorative solid layer which consists of
   (1) mixing powder glass with at least one substance capable of generating a gas on heating to obtain a first mixture;
   (2) drying said first mixture until the water content is not in excess of 5% by weight;
   (3) granulating said first mixture;
   (4) spreading a separating substance on a conveyor belt, and filling the holes of the conveyor belt with said separating substance;
   (5) distributing said first mixture from step (3) over said belt
   (6) superimposing over the first mixture from step (5) a second granulated mixture of glass and at least one substance capable of generating a gas, said second mixture being adapted to produce a cellular glass of higher density than said first mixture after heating and cellulation;
   (7) superimposing upon said second mixture granular glass enamel to obtain an assembly of said first and second mixture and said granular glass enamel;
   (8) transporting said assembly into a furnace at a temperature of 830° C. whereby the glass melts and expands and said first and second mixture are converted into cellular glass;
   (9) calibrating said assembly at 550° C. and cooling whereby a sheet is obtained comprising a first cellular glass layer, a second cellular glass layer of density greater than said first layer and an upper decorative layer.

2. Method, according to claim 1 wherein the separating substance is talcum, sand, kieselgur, cement and the holes in the belt are filled with a solid refractory material.

3. The method according to claim 1 wherein said first mixture consists of a mixture of 100 parts of glass powder, 5 parts of bentonite and 0.3 parts of sugar.

4. The method according to claim 2 wherein said separating substance is a mixture of sand and cement in the ratio of 1:1 and said solid refractory material is clay.

5. The method according to claim 1 wherein in the area of the furnace where the heating, melting and expansion of the first and second mixtures takes place, the average temperature measured at 5 cm. above the glass material is kept within a range of the same temperature up to 25 degrees centigrade higher than the temperature 5 cm under the first and second glass mixtures.

6. The method according to claim 1, wherein the expansion of the first and second glass mixture is produced perpendicularly to the conveyor belt, the side expansion not exceeding 100% of the initial width.

7. Method according to claim 1 wherein the duration of heating of the first glass mixture and second glass mixture in the furnace, until its expansion, varies between 2 and 100 minutes.

8. The method according to claim 1, wherein (after step 9), said assembly is flattened out or compacted.

9. The method according to claim 8 wherein said sheet is compacted in a direction parallel to the conveyor belt.

10. The method according to claim 8 wherein said sheet is compacted in a direction oblique with respect to the conveyor belt.

* * * * *